May 14, 1929.  R. H. CHILTON  1,712,649
STARTER MECHANISM FOR ENGINES
Filed Nov. 16, 1920
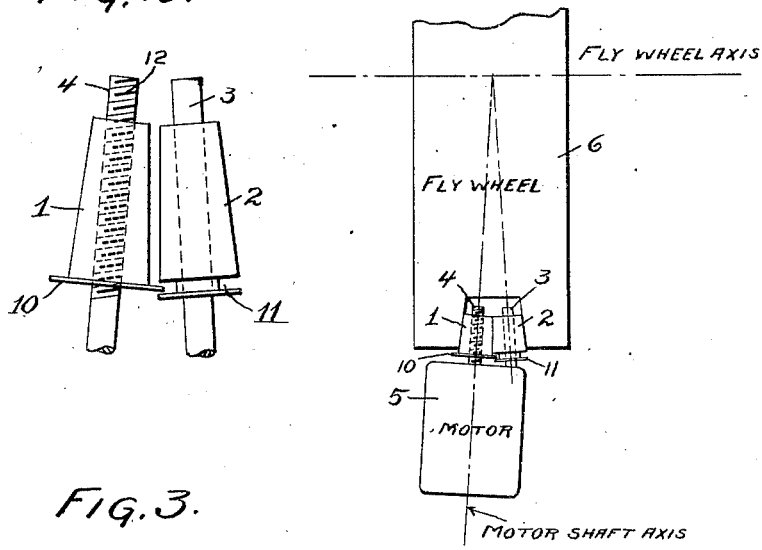
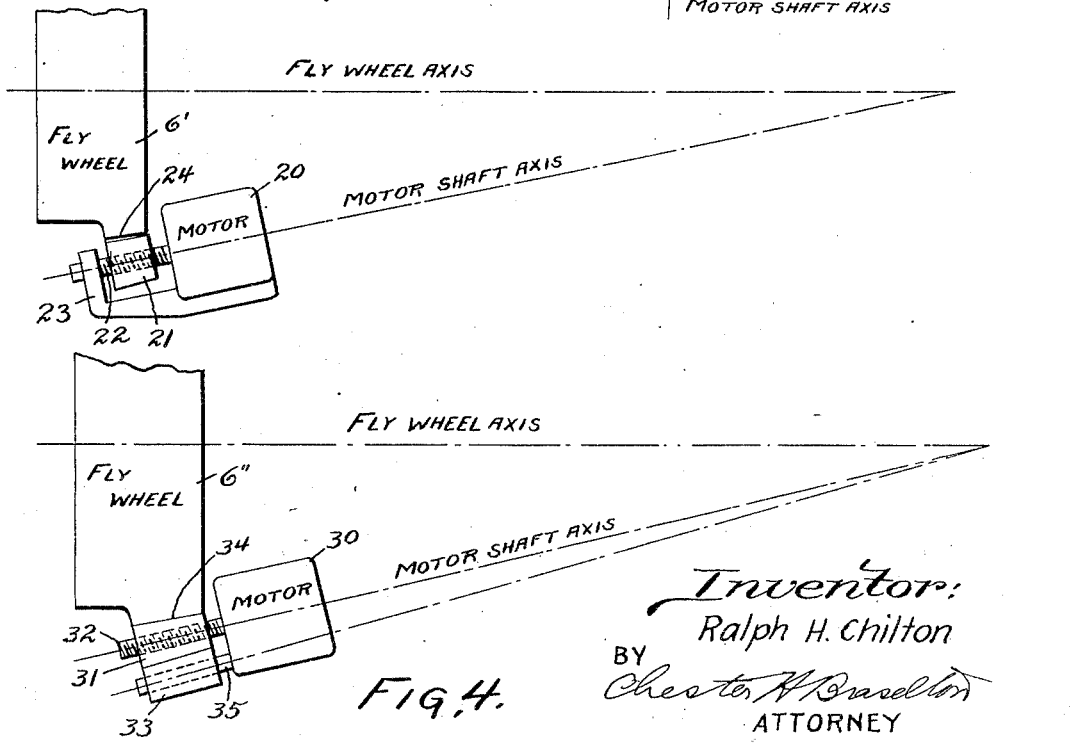
Inventor:
Ralph H. Chilton
BY
Chester H. Braselton
ATTORNEY

Patented May 14, 1929.

1,712,649

UNITED STATES PATENT OFFICE.

RALPH H. CHILTON, OF TOLEDO, OHIO, ASSIGNOR TO INDUSTRIAL RESEARCH CORPORATION, OF TOLEDO, OHIO, A CORPORATION OF DELAWARE.

STARTER MECHANISM FOR ENGINES.

Application filed November 16, 1920. Serial No. 424,449.

This invention relates to a novel means for starting an engine and has for its object such an arrangement as will provide a novel construction in engine starting devices including one in which, if a friction type of drive be used, pure rolling of the contacting surfaces may be obtained and a requisite amount of friction between the driving surfaces maintained until the engine is started.

Other objects will appear herein as I describe those particular embodiments of my invention which for purposes of illustration I have shown in the accompanying drawings in which Figure I shows diagrammatically an arrangement wherein the motor shaft is at nearly right angles with the axis of the wheel 6 to be driven.

Figure II shows a detail of Figure I on a larger scale.

Figure III shows a modification.

Figure IV shows still another modification.

In Figures I and II, 1 represents a friction cone mounted upon the motor shaft 4 by threads 12 so that when the motor is driving, the cone 1 will run forward on the shaft 4.

2 is a friction cone mounted loosely on the stationary shaft 3 and having quite a loose fit thereon.

Cones 1 and 2 run in and out on their shafts together due to the collar 10 on shaft 1 engaging in the groove 11 on cone 2. Thus it is seen that when the motor suddenly starts the threads 12 on the shaft 4 cause the friction cone 1 to run forward and engage the driven wheel 6. When this starter is used with an internal combustion engine, 6 is preferably the fly-wheel of the engine. When 1 goes forward the collar 10 thereon engaging the grooves 11 on the friction cone 2 carries the friction cone 2 forward also into engagement with the fly-wheel 6 (see Figure I). The loose fit between the cone 2 and its shaft 3 allows a pressure of cone 1 upon cone 2 to be taken by the wheel 6 instead of by the shaft 3. The taper of cones 1 and 2 is sufficiently small to get the desired pressure between cones 1 and 2 and the wheel 6. When the engine starts the wheel 6 overruns the motor and rotates cone 1 in an opposite direction on its shaft which therefore causes cone 1 to run in towards the motor thus disengaging it from the wheel 6. When cone 1 runs toward the motor it carries cone 2 with it on account of the engagement of collar 10 in groove 11 as described above.

Figure III shows a modification in which the axis of the starting motor is set at an angle to the axis of the driven wheel 6' in such a way that pure rolling may be obtained throughout the entire length of friction cone 21, and the friction surface 24 of the wheel 6'. The motor shaft 22 is supported at its outer end by a bracket 23 thus preventing bending of shaft 22. When the motor starts the threads on shaft 22 cause the friction cone 21 to run in towards the motor until it engages the friction surface 24 of the wheel 6'. This threaded engagement between 21 and shaft 22 then causes a great lateral pressure between cone 21 and wheel 6', thus cranking the engine. When the engine starts cone 21 rotates faster than the motor shaft 22, thus running forward on the threads and disengaging the wheel 6'. Of course wheel 6' may be any wheel which has driving connection to the engine.

Figure IV shows a modification similar to that shown in Figure III in which the lateral pressure upon a friction cone 31 is taken by an idler cone 33 which is supported upon a stationary shaft 35. This idler cone 33 prevents any lateral pressure upon shaft 32 thus greatly reducing the friction and heating of bearings of the motor. Shaft 35 may be rigidly supported on the motor casing or upon any other stationary support.

While I have described in more or less detail certain embodiments of my invention I do not wish to be limited thereto, as it is obvious to those skilled in the art that other embodiments and modifications may be made without departing from the scope of my invention, as defined in the following claims.

What I claim is:

1. In an engine starting mechanism, the combination of an engine gear, a motor having a shaft, a pinion having screw-threaded engagement with the shaft and adapted to be moved into engagement with said engine gear, a stub shaft supported by the motor, a second pinion having slidable engagement with the stub shaft and adapted to be moved into engagement with said engine gear, and means operated by said first pinion for moving said second pinion into engagement with said engine gear simultaneously with the movement of said first pinion into engagement with said engine gear.

2. In an engine starting device, the combination of an engine gear; a motor having a shaft; a pinion movably mounted on said shaft and adapted to be moved into engagement with said gear; a second pinion slidably mounted adjacent said first pinion and adapted to engage said first pinion when said second pinion is moved into engagement with said engine gear and automatic means for moving both said pinions into engagement with said engine gear when said motor is energized.

3. In an engine starting mechanism, the combination of an engine gear, a motor having a shaft, a pinion movably mounted upon said shaft and adapted to be moved into engagement with the engine gear, and a second pinion rotatably mounted adjacent said first pinion and adapted to engage said first pinion when said second pinion is moved into engagement with the engine gear, the axis of said motor shaft being inclined at an acute angle with the axis of the engine gear.

4. In an engine starting mechanism, the combination of an engine member, a motor having a shaft, a threaded extension upon said shaft, a conical pinion screw-threaded upon said shaft, a collar secured to said pinion, a second pinion rotatably and slidably mounted upon the second shaft positioned adjacent said motor shaft, an annular groove formed in said second pinion adapted to receive the periphery of said collar whereby movement of said first pinion causes similar movement of the second pinion, both of said pinions being adapted to be moved into engagement with the engine member when said motor is energized.

In testimony whereof, I affix my signature.

RALPH H. CHILTON.